(12) United States Patent
    Simpson

(10) Patent No.: US 8,115,749 B1
(45) Date of Patent: Feb. 14, 2012

(54) DUAL TOUCH PAD INTERFACE

(75) Inventor: Samuel K. Simpson, Los Angeles, CA (US)

(73) Assignee: Dilluvah Corp., Los Angeles, CA (US)

( * ) Notice: Subject to any disclaimer, the term of this patent is extended or adjusted under 35 U.S.C. 154(b) by 0 days.

(21) Appl. No.: 12/960,539

(22) Filed: Dec. 5, 2010

(51) Int. Cl.
    *G09G 5/00* (2006.01)
(52) U.S. Cl. ......................... 345/173; 455/566
(58) Field of Classification Search ................... 455/566; 345/173; 701/36
    See application file for complete search history.

(56) References Cited

U.S. PATENT DOCUMENTS

| | | | |
|---|---|---|---|
| 2002/0060668 A1* | 5/2002 | McDermid | 345/173 |
| 2010/0188343 A1* | 7/2010 | Bach | 345/173 |

* cited by examiner

*Primary Examiner* — Phuoc Doan
(74) *Attorney, Agent, or Firm* — Patent Ingenuity, P.C.; Samuel K. Simpson

(57) ABSTRACT

A smart phone has a dual touch pad interface that includes a graphical user interface. Further, the smart phone includes a first touch pad, which is operably connected to the smart phone, that has a plurality of first touch pad sensors arranged in at least one first touch pad shaped layout such that each of the plurality of first touch pad sensors corresponds to a letter from a first subset of a set of letters in an alphabet. In addition, the smart phone has a second touch pad, which is operably connected to the smart phone, that has a plurality of second touch pad sensors arranged in at least one second touch pad shaped layout such that each of the plurality of second touch pad sensors corresponds to a letter from a second subset of the set of letters in the alphabet.

20 Claims, 19 Drawing Sheets

DUAL TOUCH PAD INTERFACE

BACKGROUND

1. Field

This disclosure generally relates to the field of computing. More particularly, the disclosure relates to an input interface that may be utilized with a computing device.

2. General Background

Currently, the most common keyboard layout is the QWERTY keyboard layout design. QWERTY was developed over one hundred years ago as an arrangement of letters on the keyboard layout of a typewriter. The typewriter had metal arms, which each had a character attached thereto so that the character could be imprinted on paper with a keystroke of the key associated with the character. A consecutive ordering of letters led to the metal arms becoming tangled as some frequently utilized characters had associated metal bars in close proximity to one another. As a result, the typewriter would jam frequently. QWERTY helped minimized such jamming by having frequently utilized letters spaced further apart than in other designs.

Even though technology has generally led to advances in computing technology that no longer involve the typewriter, QWERTY is still utilized on many keyboards such as that of the personal computer ("PC"), laptop, net book, smart phone, cell phone, personal digital assistant ("PDA"), etc. With conventional computers such as PCs and laptops, a user typically may use ten digits to perform typing. As a result, the user may learn place his or her digits over certain predetermined keys and may then develop muscle memory for where certain fingers should move to press keys to type. Many users develop this ability well enough to be able to look at a graphical user interface ("GUI") without having to look down at the keys that are being typed. As a result, many users typically type at a very fast pace on a conventional keyboard with QWERTY.

Recent developments in technology have led to smart phones that are utilized by many users frequently on a daily basis for inputting data such as e-mails, text messages, instant messages, etc. However, these smart phones are generally so small that a user typically has to utilize user his or her thumbs to input data while the other digits are utilized to hold the device. Accordingly, the user typically has two thumbs to input data on a smart phone rather than ten digits that would typically be available on a conventional computing device. Nonetheless, most smart phones currently utilize a keyboard with QWERTY for inputting data. For example, some smart phones have a built in keyboard with QWERTY located beneath the GUI of the smart phone. A user that may be a very fast typist and may not have to look down at the keyboard when utilizing ten digits at a conventional PC will often type significantly slower and have to look down at the keyboard when typing on a smart phone. As another example, some smart phones have a virtual keyboard that is displayed in the GUI, but those smart phones have the same problems. In addition, the smart phones with a virtual keyboard may typically have a larger GUI than smart phones with a keyboard built in below the GUI, but such smart phones involve additional time requesting the virtual keyboard to be displayed.

Some smart phones do not utilize QWERTY, but instead have multiple characters per button. For example, a button may have the letters 'A,' 'B,' and 'C.' The user would then have to push the button once for 'A,' twice for the letter 'B,' and three times for the letter 'C.' Such smart phones typically take even longer than utilizing a keyboard with a QWERTY layout because the user has to press a button multiple times to type a letter instead of pushing a button once with QWERTY.

As a result, the current inputting interfaces for smart phones are inefficient. Further, the constant pressing of buttons with the thumbs is often uncomfortable for many users. In some instances, strain and/or injury on the joints may result.

SUMMARY

In one aspect of the disclosure, a smart phone has a dual touch pad interface that includes a graphical user interface. Further, the smart phone includes a first touch pad, which is operably connected to the smart phone, that has a plurality of first touch pad sensors arranged in at least one first touch pad shaped layout such that each of the plurality of first touch pad sensors corresponds to a letter from a first subset of a set of letters in an alphabet. In addition, the smart phone has a second touch pad, which is operably connected to the smart phone, that has a plurality of second touch pad sensors arranged in at least one second touch pad shaped layout such that each of the plurality of second touch pad sensors corresponds to a letter from a second subset of the set of letters in the alphabet, the second subset including remaining letters in the alphabet that are distinct from that of the first subset. The smart phone also has a processor that (i) receives sensor data from the first touch pad and the second touch pad, (ii) determines a last character in the sensor data received prior to the user removing a digit from the first touch pad or the second touch pad, and (iii) outputs the last character to the graphical user interface.

In another aspect of the disclosure, a smart phone has a dual touch pad interface. The smart phone has a graphical user interface. Further, the smart phone has a first touch pad, which is displayed in the graphical user interface, that has a plurality of first touch pad sensors arranged in at least one first touch pad shaped layout such that each of the plurality of first touch pad sensors corresponds to a letter from a first subset of a set of letters in an alphabet. In addition, the smart phone has a second touch pad, which is displayed in the graphical user interface, that has a plurality of second touch pad sensors arranged in at least one second touch pad shaped layout such that each of the plurality of second touch pad sensors corresponds to a letter from a second subset of the set of letters in the alphabet, the second subset including remaining letters in the alphabet that are distinct from that of the first subset. The smart phone also has a processor that (i) receives sensor data from the first touch pad and the second touch pad, (ii) determines a last character in the sensor data received prior to the user removing a digit from the first touch pad or the second touch pad, and (iii) outputs the last character to the graphical user interface.

In yet another aspect of the disclosure, a smart phone has a dual touch pad interface. The smart phone has a graphical user interface. Further, the smart phone has a first touch pad, which is displayed in the graphical user interface, that has (i) a first rest pad and (ii) a plurality of first touch pad sensors arranged in at least one first touch pad shaped layout such that each of the plurality of first touch pad sensors corresponds to a letter from a first subset of a set of letters in an alphabet. In addition, the smart phone has a second touch pad, which is displayed in the graphical user interface, that has (i) a second rest pad and (ii) a plurality of second touch pad sensors arranged in at least one second touch pad shaped layout such that each of the plurality of second touch pad sensors corresponds to a letter from a second subset of the set of letters in the alphabet, the second subset including remaining letters in the alphabet that are distinct from that of the first subset. The smart phone also has a processor that (i) receives sensor data from the first touch pad and the second touch pad, (ii) determines if the first rest pad or the second rest pad is touched by the user, (iii) determines a last character in the sensor data received prior to the user touching the first rest pad or the second rest pad, and (iv) outputs the last character to the graphical user interface.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A DTPI is provided. The DTPI may be utilized to provide input with the thumbs of a user to a computing device. The term computing device is intended herein to include any type of device that has a processor such as a PC, desktop computer, laptop, net book, notebook, cell phone, smart phone, PDA, personal media player, set top box, or the like. As the smart phone is an example of a computing device in which the thumbs are mostly utilized for inputting data, the examples and illustrations provided herein are directed toward a smart phone. However, the DTPI may be utilized with other types of computing devices.

Figure 1:
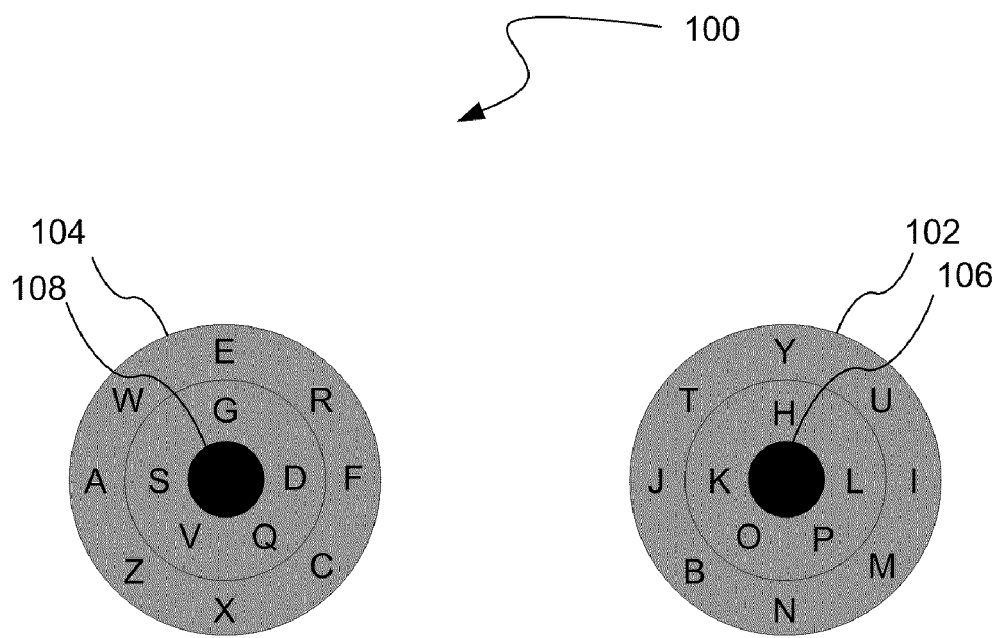
FIG. 1 illustrates a Dual Touch Pad Interface ("DTPI{").

FIG. 1 illustrates the DTPI 100. In one embodiment, the DTPI 100 includes two circular input interfaces. For example, the circular input interfaces may be touch pads. Each of the touch pads may have a plurality of sensors to determine a particular letter that a user would like to input. As an example, a first circular touch pad 102 may have sensors for a first set of thirteen letters and a second circular touch pad 104 may have sensors for a second set of thirteen letters. The user may place his or her right thumb on the first touch pad 102 and his or her left thumb on the second touch pad 104. A QWERTY keyboard has a certain number of letters that the user types with digits on his or her right hand and a certain number of letters that the user types with digits on his or her left hand. To help ease the transition from a QWERTY keyboard to the DTPI 100, similar letters to that which the user would type on the QWERTY keyboard with his or her right hand digits appear in the first circular touch pad 102 and similar letters to that which the user would type on the QWERTY keyboard with his or her left hand digits appear in the left circular touch pad 104. However, this illustration is provided only as an example as other configurations may have an assortment of letters from the alphabet that is somewhat or completely different than the QWERTY assortment.

In one embodiment, the first touch pad 102 and the second touch pad 104 have at least one sensor for each letter displayed on the respective touch pad. In other words, a particular portion of each touch pad is dedicated to each letter in the alphabet. As an example, the letter 'E' has the top portion of the outer circle of the second touch pad 104. A sensor associated with the top region determines if a user has touched and/or released his or her thumb in the top region of the outer circle. Further, sensors are positioned to make similar determinations in the middle circles of each of the touch pads.

The DTPI 100 also has a set of thumb rest pads. For example, the first touch pad 102 may have a first rest pad 106, and the second touch pad 104 may have a second rest pad 108.

In one embodiment, a user inputs a letter by releasing his or her thumb over the region with the character. For example, the user sliding his or her thumb over different characters in the second touch pad 104 will not select a character. The selection of the character will take place when the user releases his or her thumb over the region associated with the letter 'E.' The user may keep his or her right hand on the first touch pad 102 when releasing his or her left hand from the second touch pad 104 to input the character 'E.' In an alternative embodiment, a user inputs a letter by touching his or thumb over the region with the character. In yet another alternative embodiment, the actuators such as buttons may be utilized so that the user may press the characters that the user would like inputted.

In one embodiment, the DTPI 100 is built into the device below a graphical GUI. In another embodiment, the DTPI 100 is displayed on the GUI. As an example, a user may provide a command with a touch on the GUI to bring up the DTPI 100. The user may then provide a command to remove the DCTP 100.

Figure 2A:
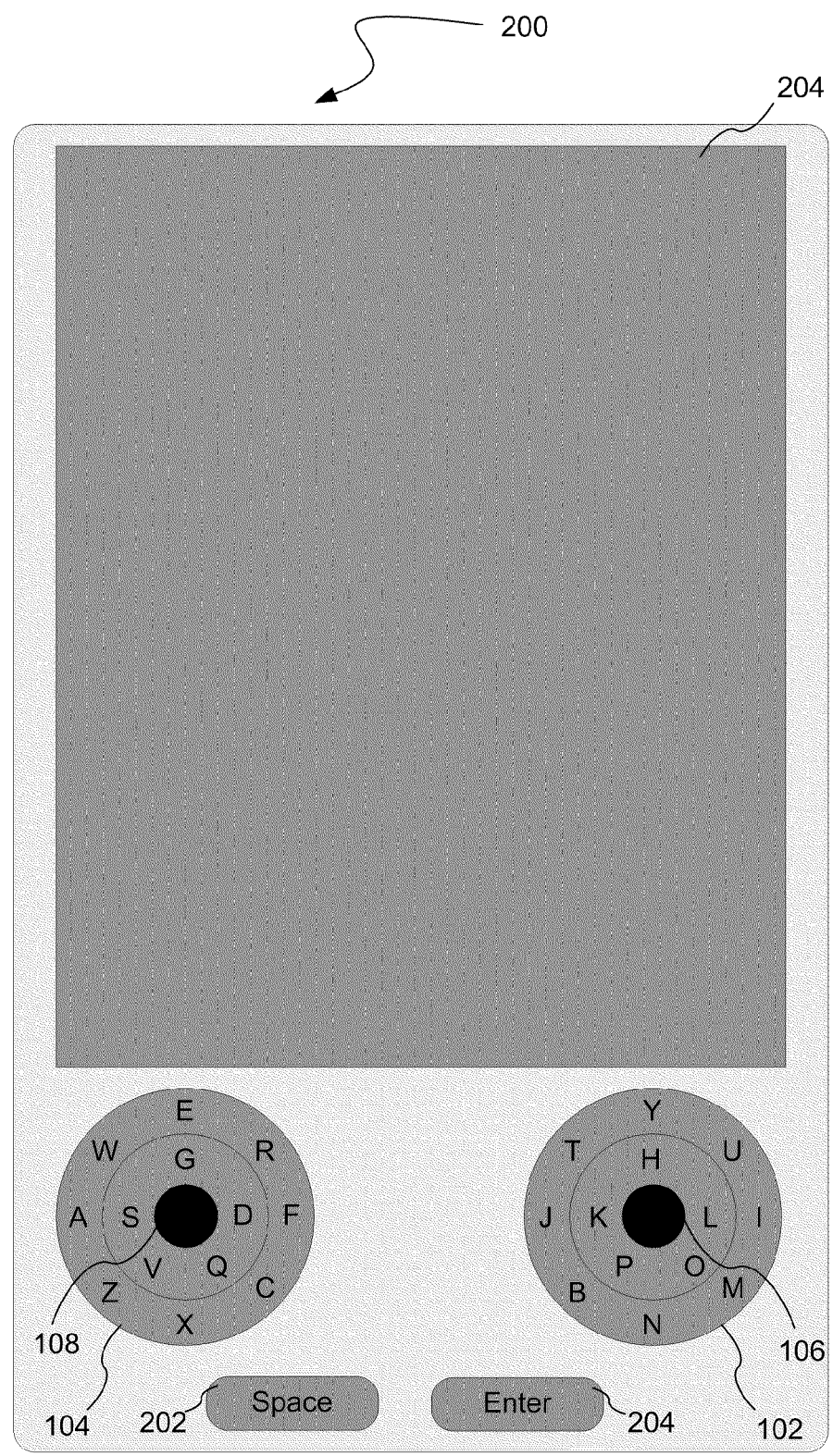
FIG. 2A illustrates a smart phone 200 with the DTPI.

FIG. 2A illustrates a smart phone 200 with the DTPI 100. The smart phone has a GUI 204 and the DTPI 100 positioned beneath the GUI 204. In one embodiment, a space pad 202 and an enter pad 204 are located beneath the DTPI 100. In one embodiment, the user may touch the space pad 202 and lift his or her thumb to enter a space. Further, in one embodiment, the user may touch the enter pad and lift his or her thumb to input enter. In another embodiment, the user may touch the space pad 202 to insert a space and/or touch the enter pad 204 to input enter. In yet another embodiment, the space pad 202 may be an actuator such as a button that the user presses to insert a space and/or the enter pad 204 may be an actuator such as a button that the user presses to insert enter. The space pad 202 and/or the enter pad 204 may be different configurations than the first touch pad 102 and the second touch pad 104. For example, the first touch pad 102 and the second touch pad 104 may provide input when the user releases one of his or her thumbs, but may provide a space when the user touches the space pad 202 and/or the enter pad 204. In one embodiment, other data such as numerals and punctuation are entered through touch screen commands on the GUI 204. The DTPI 100 is directed to input of frequently utilized data such as letters. Accordingly, less frequently utilized characters may be inputted through the GUI 204.

In one embodiment, the space pad 202 and/or the enter pad 204 may not be utilized. For example, the space and enter functions may be appear as touch screen options in the GUI 204.

Figure 2B:
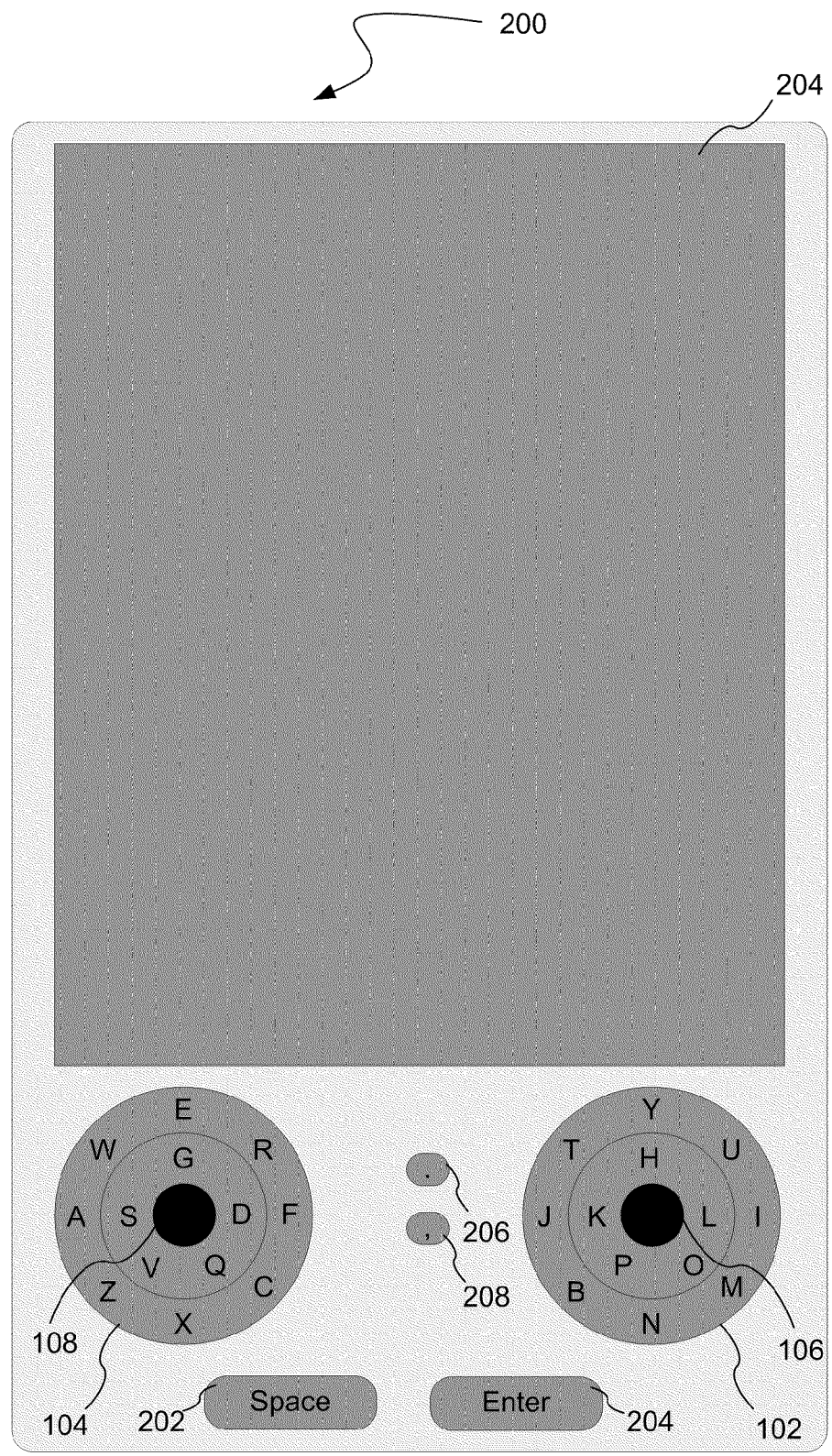
FIG. 2B illustrates an alternative configuration of the smart phone with the DTPI.

FIG. 2B illustrates an alternative configuration of the smart phone 200 with the DTPI 100. At least one actuator or sensor may be provided to input frequently utilized punctuation. For example, a period actuator 206 and a comma actuator 208 may be utilized. The period actuator 206 may be utilized to input a period as the period is a frequently utilized form of punctuation. The comma actuator 208 may be utilized to input a comma as the comma is a frequently utilized form of punctuation. Less frequently utilized forms of punctuation may be selected with the touch screen. In one embodiment, an actuator or sensor may be provided outside of the GUI 204 to invoke a menu display for the less frequently utilized forms of punctuation in the GUI 204. In another embodiment, a virtual menu display in the GUI 204 may be utilized for the less frequently utilized forms of punctuation in the GUI 204. Further, in one embodiment, an actuator or sensor may be provided outside of the GUI 204 to invoke a menu display for numerals in the GUI 204. Most users do not utilize many numbers on a smart phone for text input. Users typically enter numbers when utilizing the smart phone to dial a number to make a telephone call. Accordingly, the user may invoke a numeral display in the GUI 204 when the user would like to make a telephone call. In another embodiment, a virtual menu display in the GUI 204 may be utilized for the display of numerals in the GUI 204.

Figure 2C:
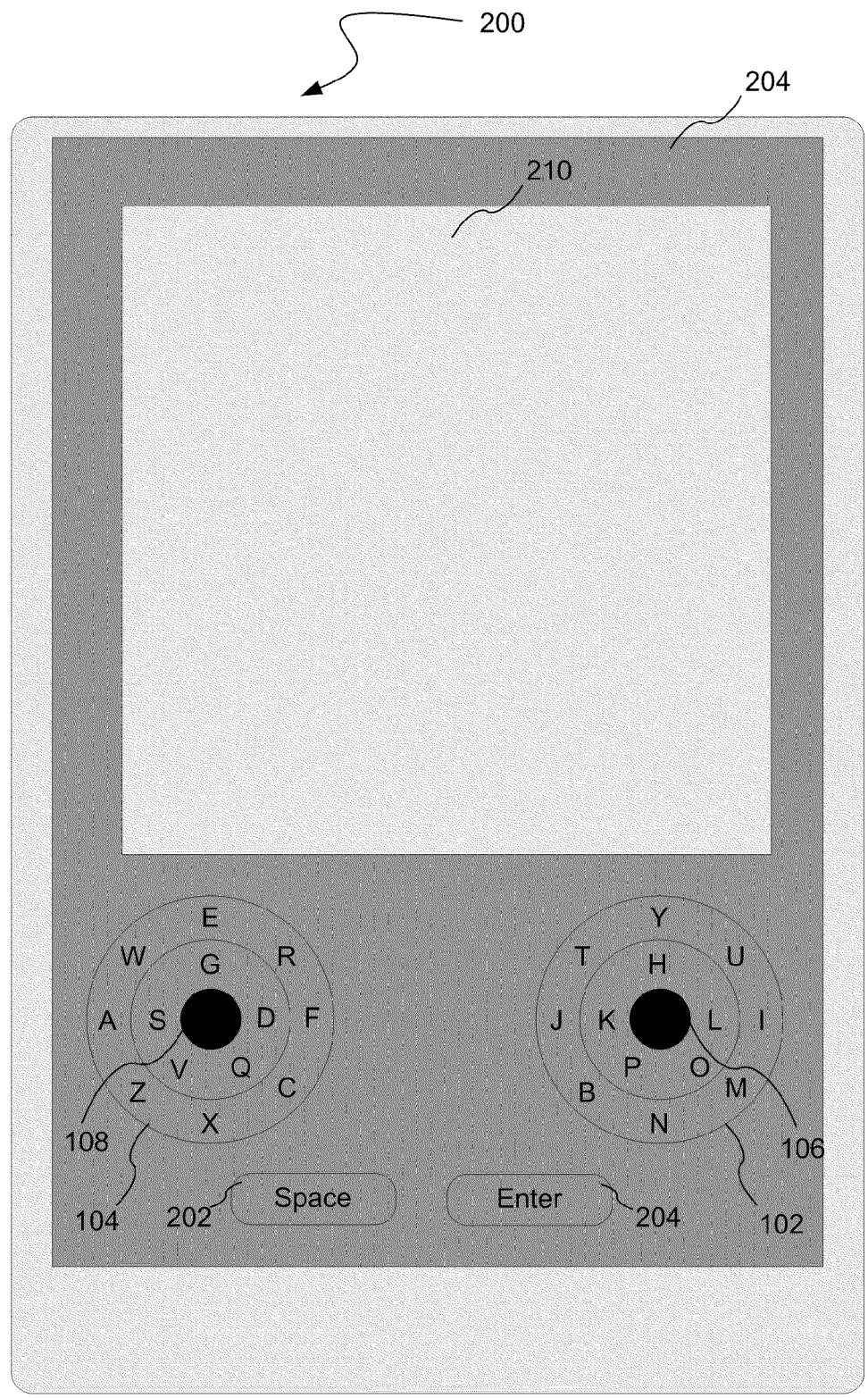
FIG. 2C illustrates the DTPI of FIG. 1 displayed in a graphical user interface ("GUI").

FIG. 2C illustrates the DTPI 100 of FIG. 1 displayed in the GUI 204. In one embodiment, an input box 210 is displayed to display the input indicated by the DTPI 100. In another embodiment, the DTPI 100 may be displayed or removed by commands from the user. Further, in one embodiment, numerals and/or other characters may be displayed in the GUI 204. In another embodiment, the user may provide commands to display numerals and/or additional characters.

Figure 3A:
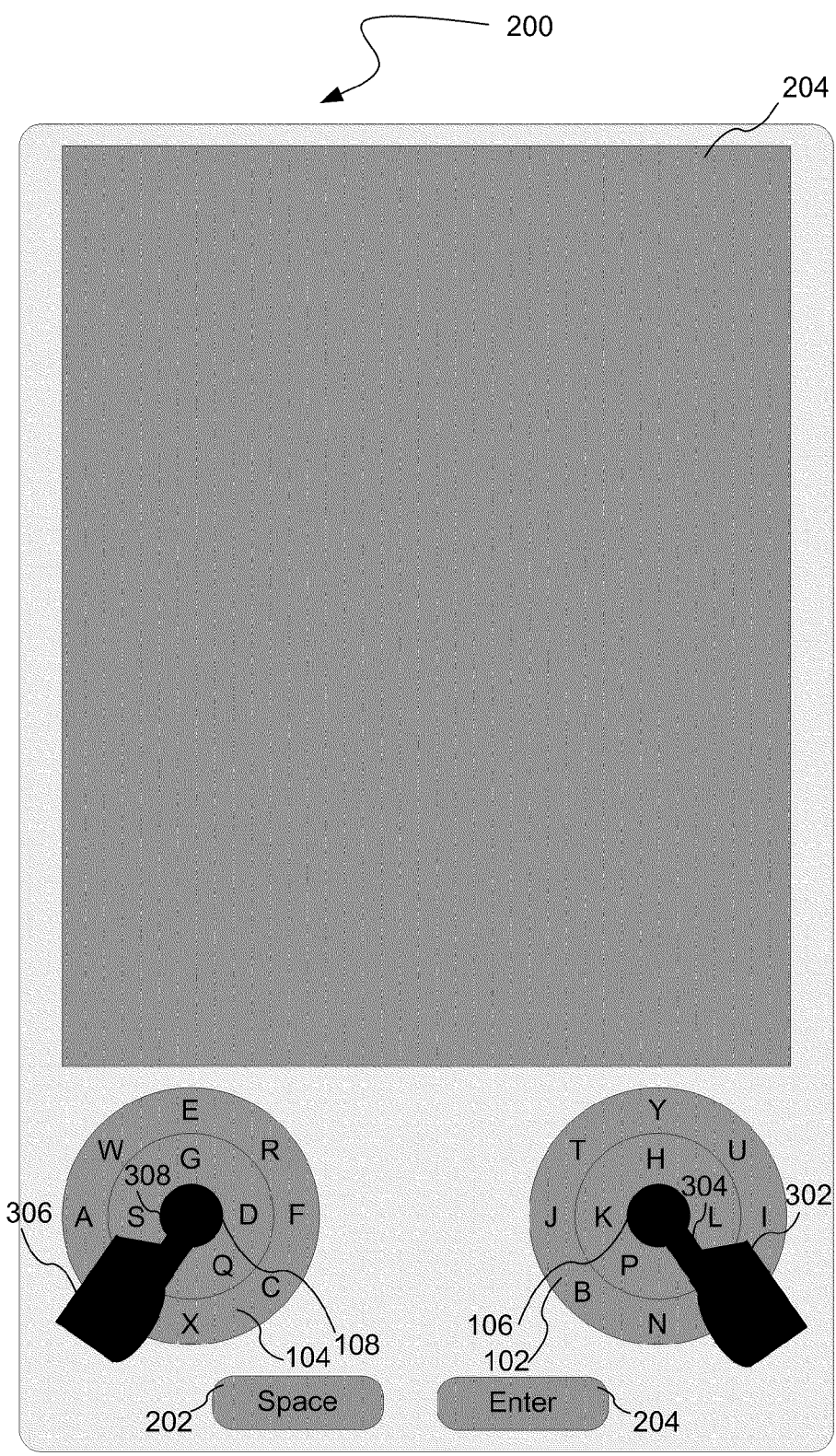
FIG. 3A illustrates the user utilizing a right thumb of his or her right hand to interact with the first touch pad and a left thumb with his or her left hand to interact with the second touch pad.
Figure 3B:
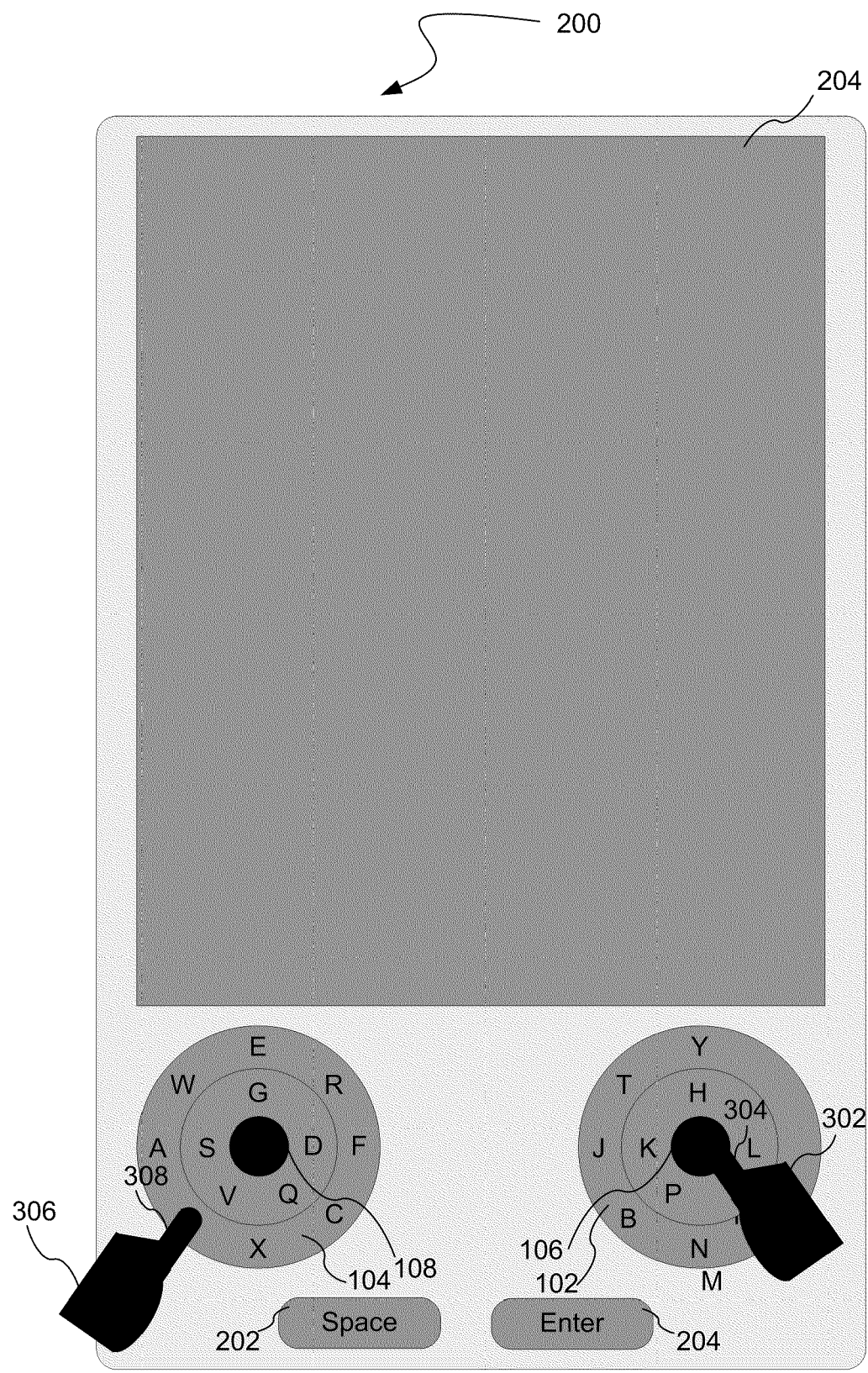
FIG. 3B illustrates the user moving his or her left thumb from the second rest pad without removing his or her right thumb from the second touch pad.
Figure 3C:
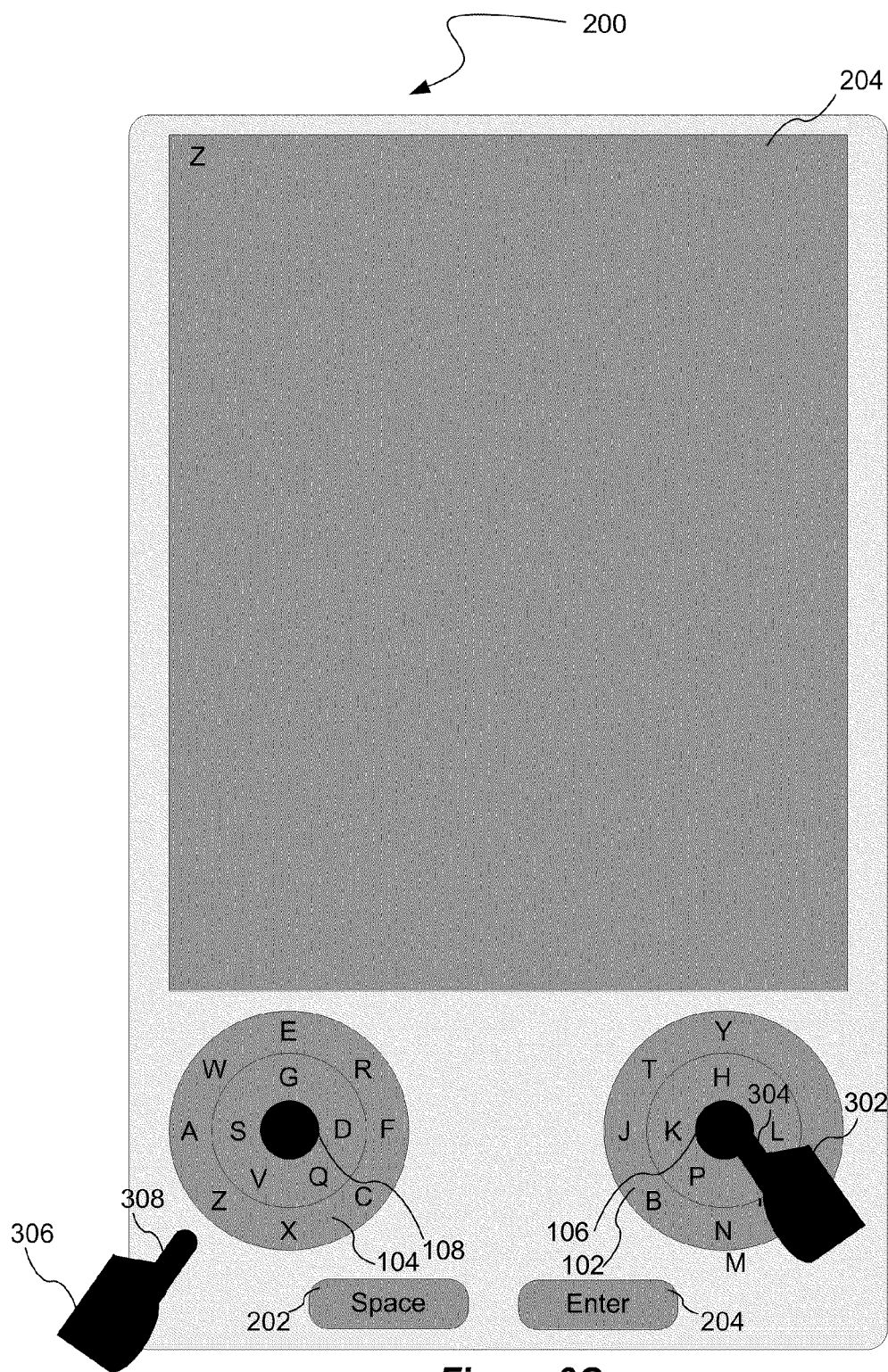
FIG. 3C illustrates the user removing his or her thumb from the second touch pad after the thumb was last over the region associated with the letter 'Z.'

FIGS. 3A-3C illustrates examples of the user utilizing the DTPI 100 illustrated in FIG. 1 with the smart phone 200. FIG. 3A illustrates the user utilizing a right thumb 304 of his or her right hand 302 to interact with the first touch pad 102 and a left thumb 308 with his or her left hand 306 to interact with the second touch pad 104. The hands and thumbs are not drawn to scale, but rather are being displayed for ease of illustration. The user has placed his or her right thumb 304 on the first rest pad 106 and his or her left thumb on the second rest pad 108. In this configuration, as both thumbs are touching the respective rest pads, no data is being inputted into the GUI 204. FIG. 3B illustrates the user moving his or her left thumb 308 from the second rest pad 108 without removing his or her right thumb 304 from the second touch pad 104. The user moves his or her left thumb 308 over the letter 'V.' The user stops moving his her or left thumb 308 at the letter 'Z.' The user could have moved his or her left thumb 308 to letters in the inner indicia region and/or the outer indicia region and still arrived at the letter 'Z' in without any data being displayed in the GUI 204 so long as the user does not remove his or her thumb from the second touch pad 104 during that movement. FIG. 3C illustrates the user removing his or her thumb 308 from the second touch pad 104 after the thumb 308 was last over the region associated with the letter 'Z.' As a result, the letter 'Z' is displayed in the GUI 204. The user may then place his or her left thumb 308 back on the second touch pad 104 without providing any additional input until a thumb is removed from one of the touch pads again to provide input. The user does not have to place his or her left thumb back on the second rest pad 108. However, the user may choose to place his or her left thumb on the left rest pad if the user does not want to input a letter. As an example, the user may place his or her left thumb initially on the letter 'Q.' If the user removes his or her thumb, the letter Q will be inputted. However, if the user changes his or her mind, the user may move his or her thumb to the second rest pad 108 and no letters will be inputted. The user may then remove his or her left thumb from the second rest pad 108 without any letters being inputted.

The user may seamlessly move with natural motions of the thumbs over the touch pads and release to quickly input data. By not having to press buttons, the user also reduces the amount of strain on the thumb joints. Further, the user can quickly move to different letters in the circular configurations. In addition, the user may develop the muscle memory for the positions of the letters. For example, the user may learn to remember that the left thumb 308 at the bottom of the second touch pad 104 will input the letter 'X' when released. In another embodiment, grooves or other tactile indicators may indicate circular boundaries so that the user can feel when he or she is moving in or out of the outer region, inner region, or rest pad of a touch pad.

Although circular configurations are illustrated for the touch pads, other types of shapes may be utilized. For example, the configurations may be oval, triangular, hexagonal, etc.

Further, the touch pads are not limited to being positioned outside of the GUI 204. In one embodiment, the touch pads are virtual touch pads that are positioned within the GUI 204.

In one embodiment, additional pads and/or actuators may be utilized for numerals, punctuation, etc. For example, additional pads may be positioned next to the space pad 202 for numerals, punctuation, etc. In yet another embodiment, additional circles on the touch pads may be utilized for numerals, punctuation, etc. In another embodiment, virtual buttons may be utilized for numerals, punctuation, etc. As these additional functions are not typically utilized as much as letters of the alphabet, these functions may be positioned in a different position than the first touch pad 102 and the second touch pad 104.

Figure 4:
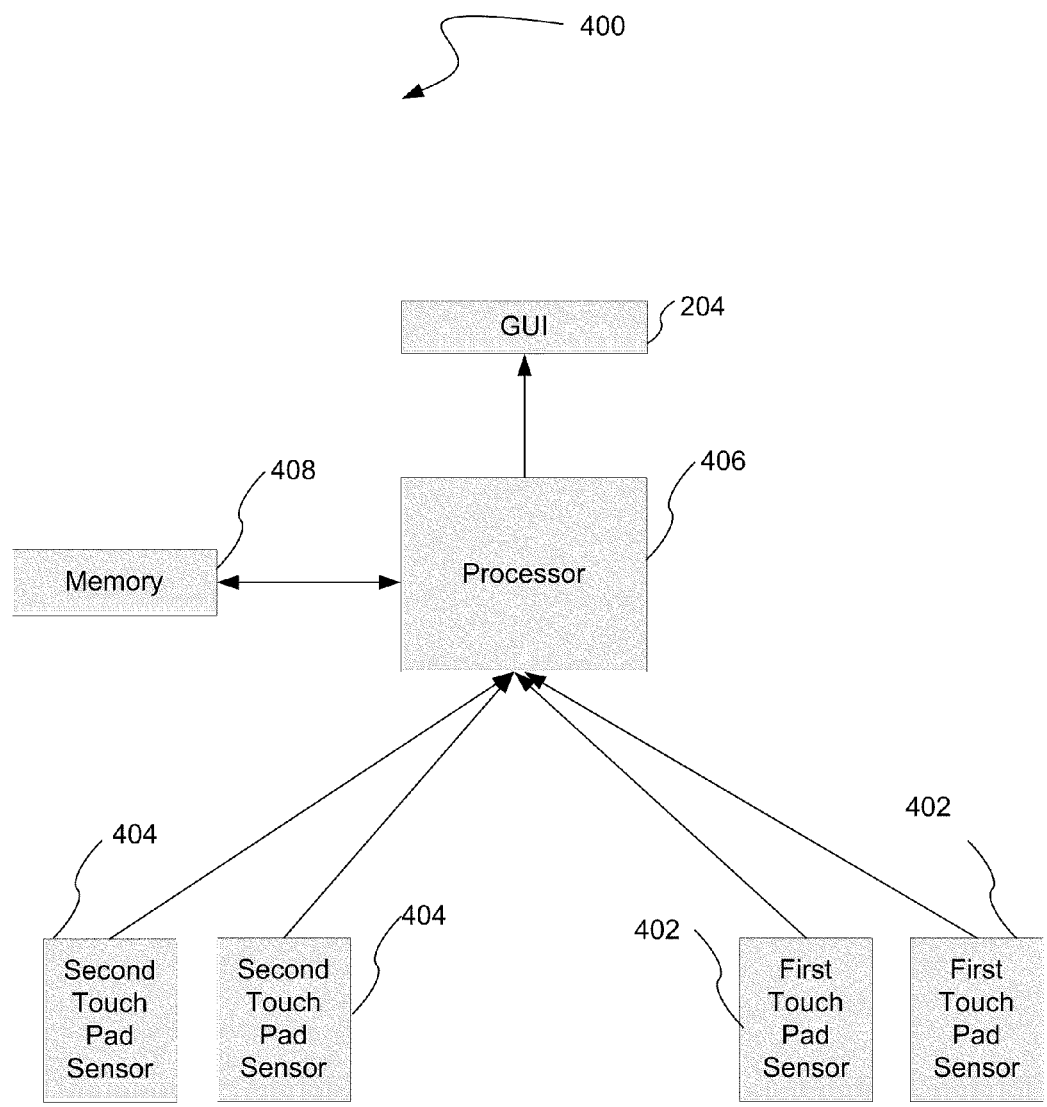
FIG. 4 illustrates a system configuration for the smart phone.

FIG. 4 illustrates a system configuration for the smart phone 200. The smart phone 200 includes one or more first touch pad sensors 402 and one or more second touch pad sensors 404. A processor 406 receives input data from the one or more first touch pad sensors 402 and/or the one or more second touch pad sensors 404. The processor 406 may determine the letter to be displayed from the input data. A memory 408 may be utilized by the processor to store and retrieve data the sensor data. The processor 406 then provides the letter to be displayed to the GUI 204.

Although the user may move his or her thumb over letters that are not intended to be displayed, only the letter at which the user removes his or her thumb is displayed. In one embodiment, the processor receives all inputs from sensors, but does not display an input unless no other sensor is activated. As an example, in FIG. 3B, when the user slides his or her left thumb 308 from the letter 'A' to the letter 'W,' the user has removed his or left thumb 308 from the letter 'A,' but does not intend to input the letter 'A' because her or her thumb slides from the letter 'A' to the letter 'W' rather than being released from the letter 'A' and then touching the letter 'W.' Accordingly, to prevent the letter 'A' from being displayed, the processor 406 may receive the input regarding the letter 'A,' but ignores that input because the processor receives an input regarding the letter 'W.' In one configuration, a time threshold may be established for receiving the subsequent letter input. For example, the time threshold may be a very small time in which a user would unrealistically be able to remove his or her thumb from the touch pad and touch the touch pad again. In alternative configuration, an additional sensor may be utilized in each touch pad. The additional sensor may indicate that the thumb of the user is touching some portion of the touch pad. Accordingly, the input may not be displayed unless that additional sensor is deactivated to indicate that the user has released his or her thumb. The input received from the sensors associated with the characters is still received, but only the last character input received prior to the additional sensor being deactivated is displayed. The memory 408 may store the input received from the sensors so that the last input received prior to deactivation of the additional sensor may be displayed.

Figure 5:
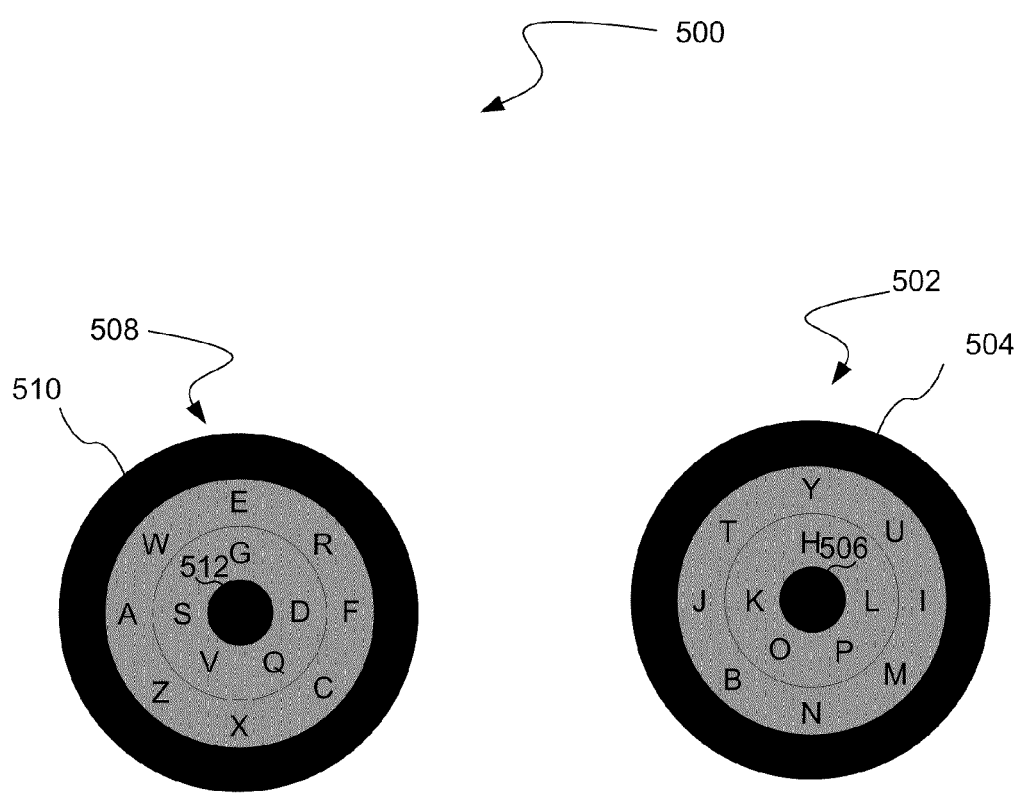
FIG. 5 illustrates an alternative DTPI.

FIG. 5 illustrates an alternative DTPI 500. In one embodiment, the DTPI 500 has a first touch pad 502 and a second touch pad 508. As an example, these touch pads may have the same plurality of letters as the DTPI 100 illustrated in FIG. 1. However, the DTPI 500 has a first outer rest pad 504 and a first inner rest pad 506 located on the first touch pad 502. The DTPI 500 also has a second outer rest pad 510 and a second inner rest pad 512. The inner rest pads are positioned within inner circular regions of the DTPI 500 whereas the outer rest pads are positioned outside of the outer regions of the DTPI 500. Rather than releasing a thumb over a letter to indicate an input as illustrated with the DTPI 100 in FIGS. 2A-3C, the DTPI 500 illustrated in FIG. 5 inputs the last letter that was touched before the user moves his or her thumb to a rest pad. The movement to the rest pad indicates that the letter should be inputted rather than indicating that the letter should not be inputted. The movement may be a sliding motion or a movement from a letter off the entire touch pad and then on the touch pad to a rest pad.

Figure 6A:
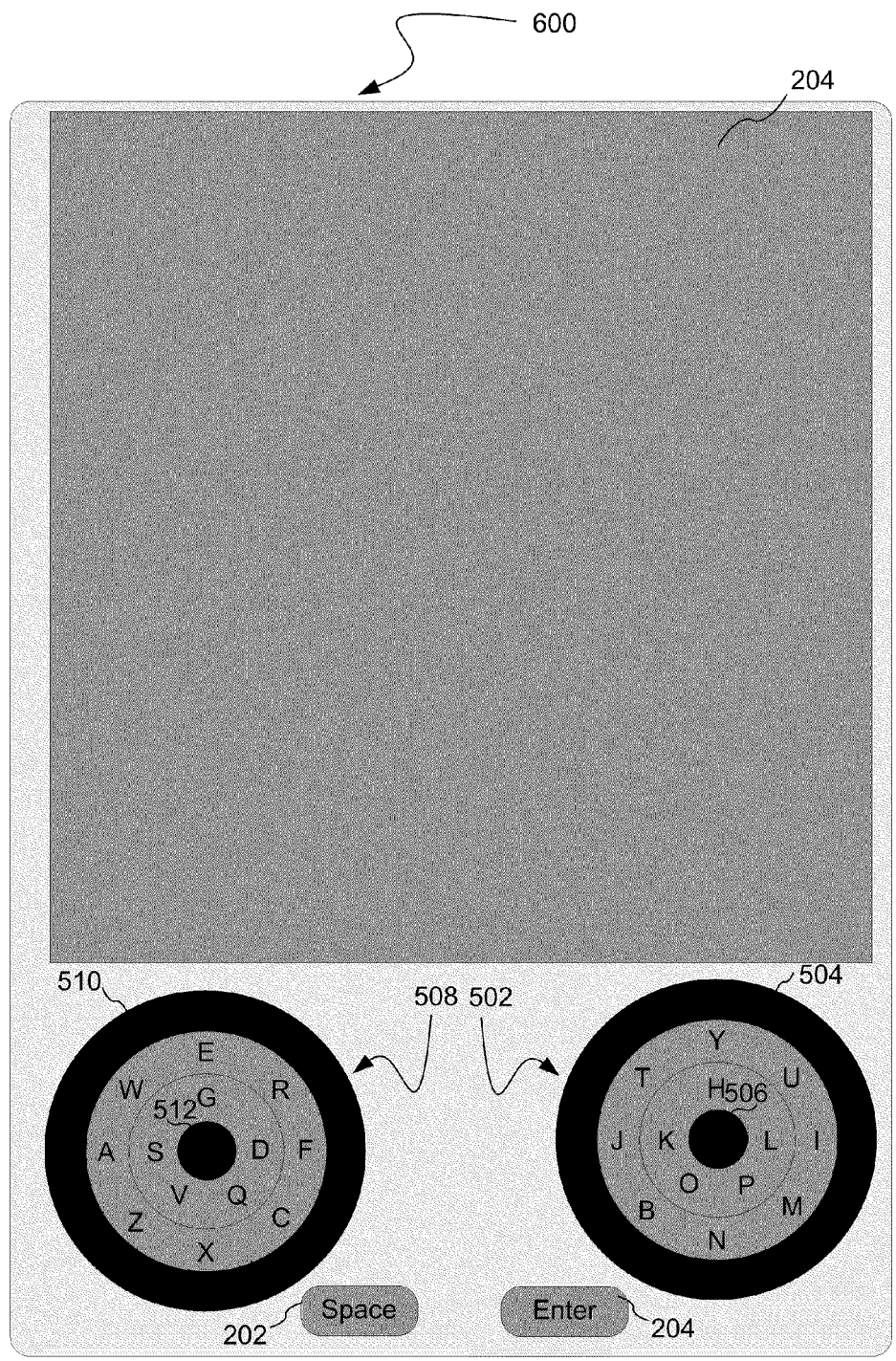
FIG. 6A illustrates a smart phone with the DTPI of FIG. 5 integrated below the GUI.

FIG. 6A illustrates a smart phone 600 with the DTPI 500 of FIG. 5 integrated below the GUI 204. Various additional sensors, buttons, actuators, etc. may also be utilized to provide for numerals and/or other characters.

Figure 6B:
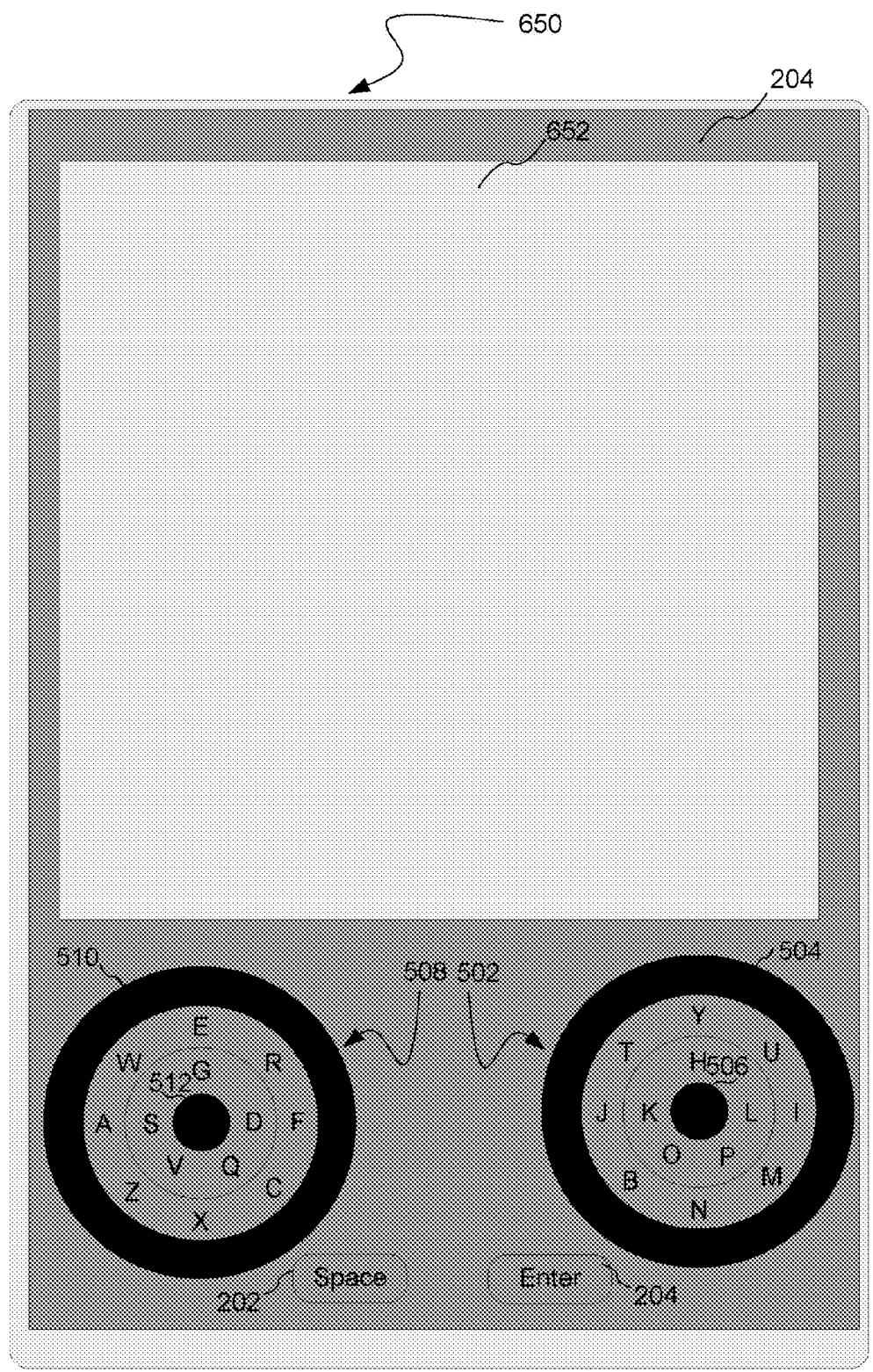
FIG. 6B illustrates a smart phone with the DTPI of FIG. 5 integrated within the GUI.

FIG. 6B illustrates a smart phone 650 with the DTPI 500 of FIG. 5 integrated within the GUI 204. In one embodiment, the DTPI may be invoked and/or removed with a command by the user. Further, in one embodiment, the user may input text into a text box 652.

Figure 7A:
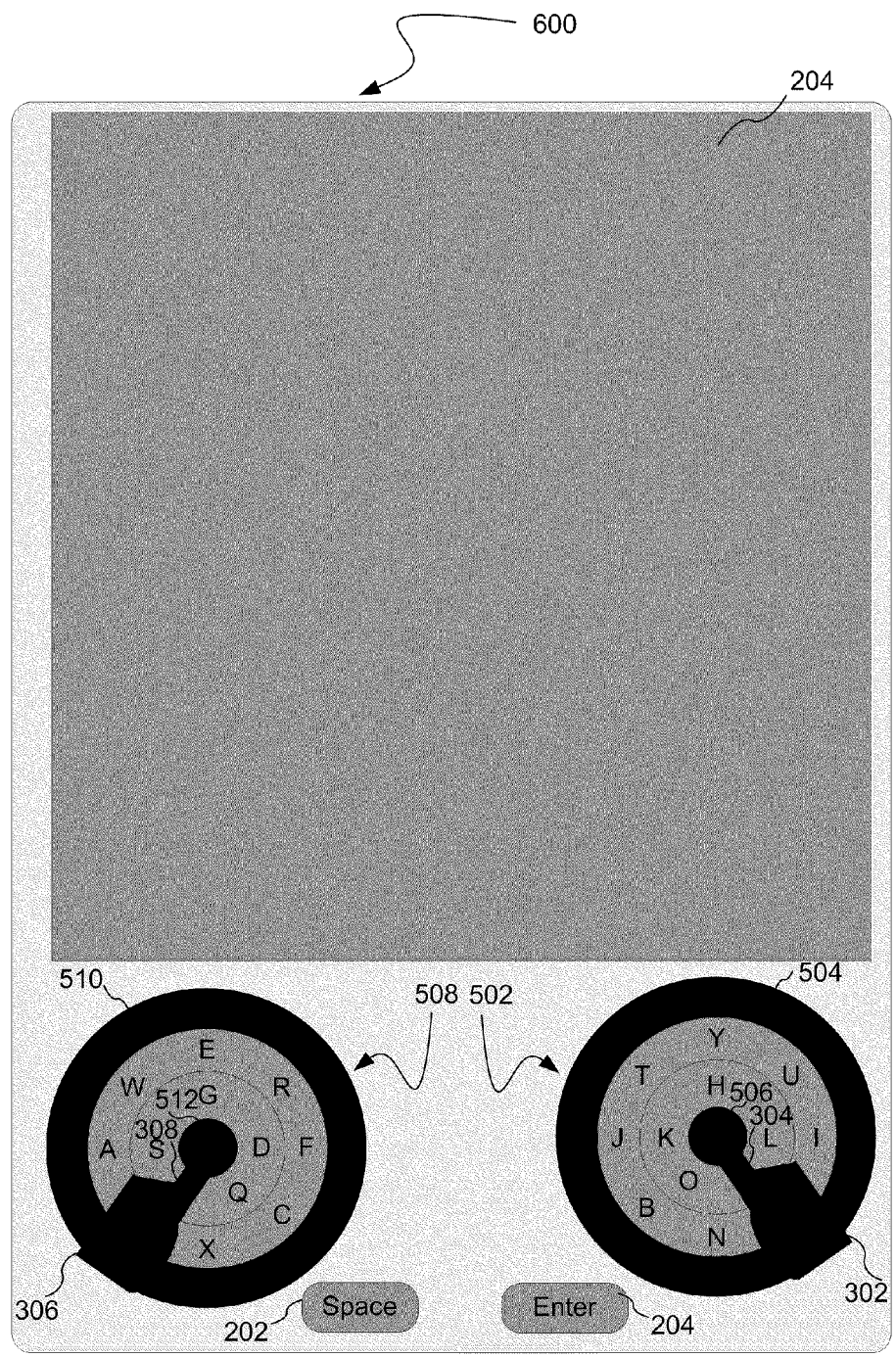
FIG. 7A illustrates the user utilizing a right thumb of his or her right hand to interact with the first touch pad and a left thumb with his or her left hand to interact with the second touch pad.

FIGS. 7A-7D illustrates examples of the user utilizing the DTPI 500 illustrated in FIG. 5 with the smart phone 600. FIG. 7A illustrates the user utilizing a right thumb 304 of his or her right hand 302 to interact with the first touch pad 502 and a left thumb 308 with his or her left hand 306 to interact with the second touch pad 508. The hands and thumbs are not drawn to scale, but rather are being displayed for ease of illustration. The user has placed his or her right thumb 304 on the first inner rest pad 506 and his or her left thumb on the second inner rest pad 512. In this configuration, as both thumbs are initially touching the respective inner rest pads, no data is being inputted into the GUI 204. For example, the user may not have inputted any date prior to placing his or her thumbs on the inner rest pads. In another embodiment, a time of the last character touched may be recorded. If the user does not move his or her thumb to a rest pad within a predetermined time threshold, the character is not inputted.

Figure 7B:
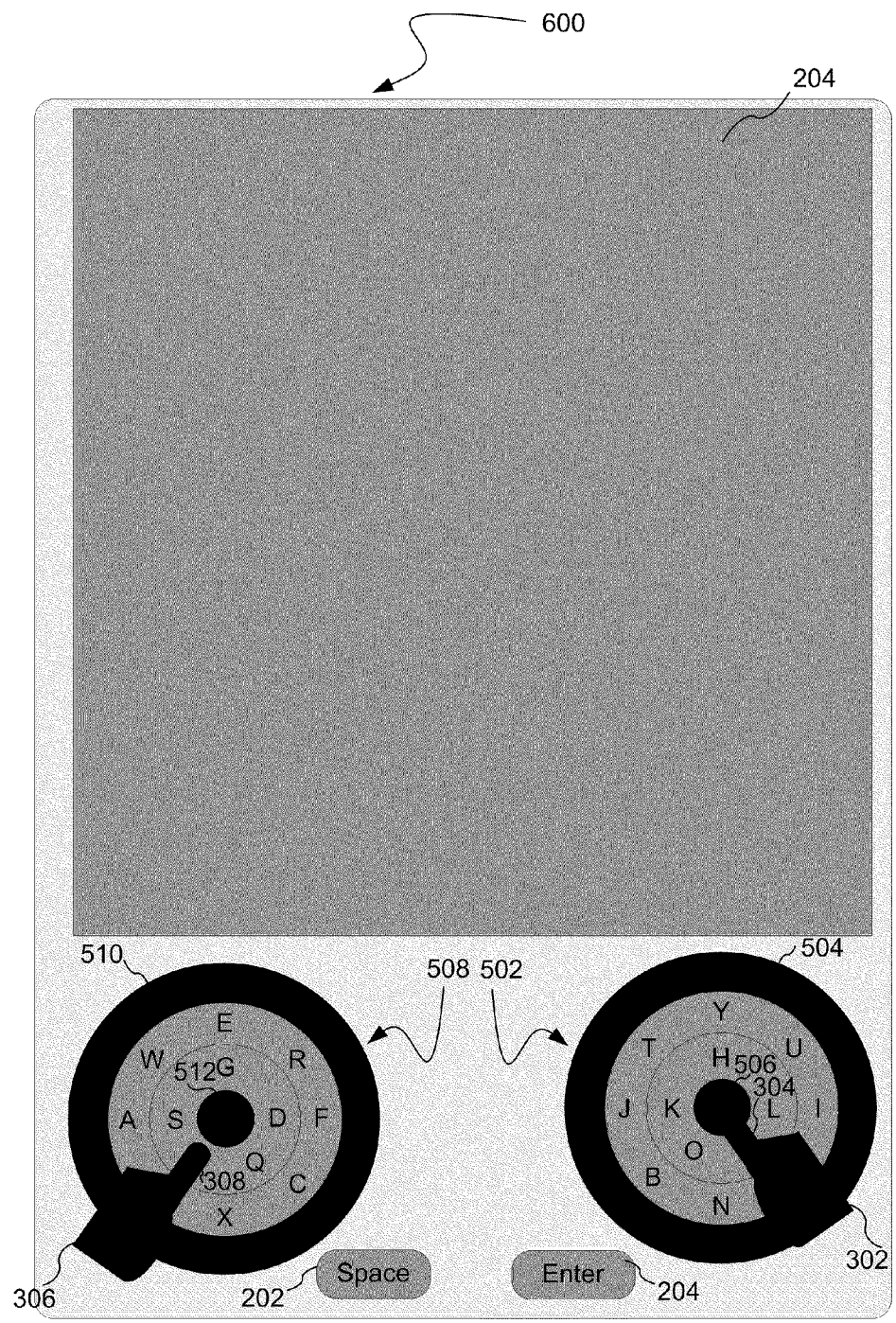
FIG. 7B illustrates the user moving his or her left thumb from the second inner rest pad without removing his or her right thumb from the second touch pad 104.

FIG. 7B illustrates the user moving his or her left thumb 308 from the second inner rest pad 512 without removing his or her right thumb 304 from the second touch pad 104. The user moves his or her left thumb 308 over the letter 'V.'

Figure 7C:
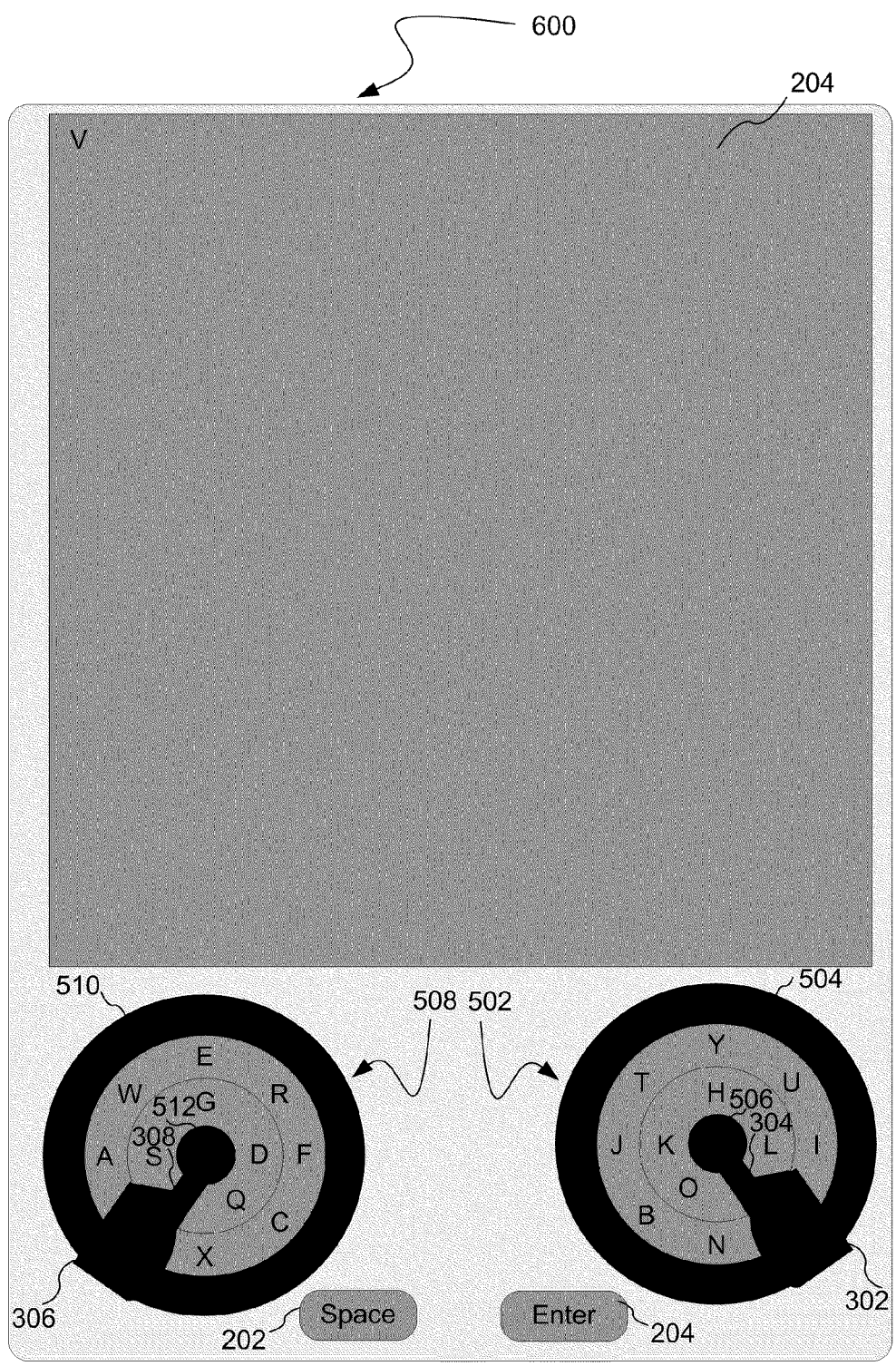
FIG. 7C illustrates the user moving his or her left thumb from the letter V back to the second inner rest pad.

FIG. 7C illustrates the user moving his or her left thumb 308 from the letter 'V' back to the second inner rest pad 512. As a result, the letter 'V' is displayed in the GUI 204. The inner rest pads are located close to the inner rest pads so that the user can easily move back and forth between letters in the inner region and the inner rest pad for quick input of letters in the inner region.

Figure 7D:
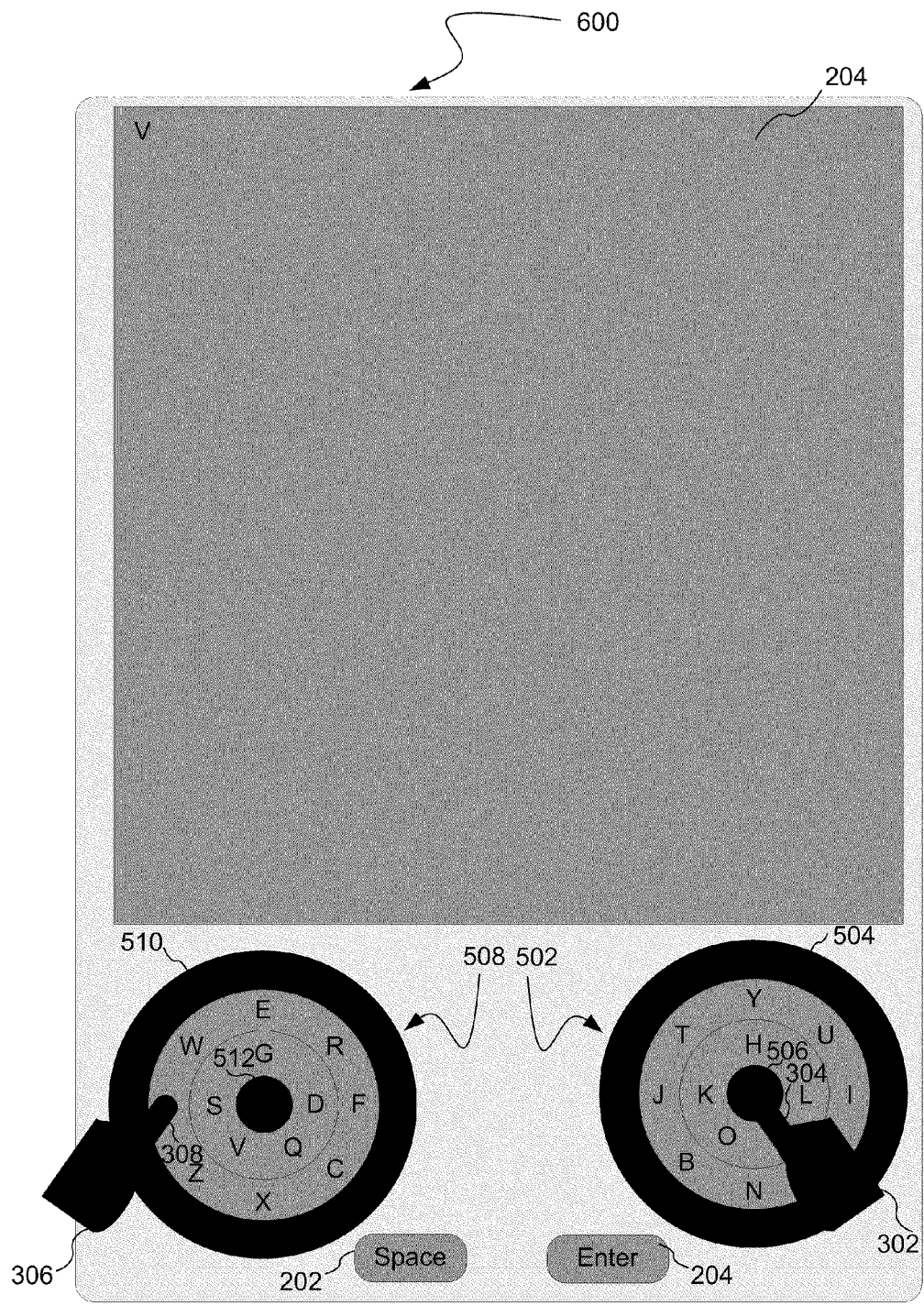
FIG. 7D illustrates the thumb of the user after inputting the letter V having moved to the letter 'A.'

FIG. 7D illustrates the thumb of the user after inputting the letter V having moved to the letter 'A.' In one embodiment, the user does not move his or her thumb back to the second inner rest pad 512 to input the letter 'A' because the user may slide his or her thumb over the letter 'S', which may then get inputted when the thumb of the user reaches the second inner rest pad 512.

Figure 7E:
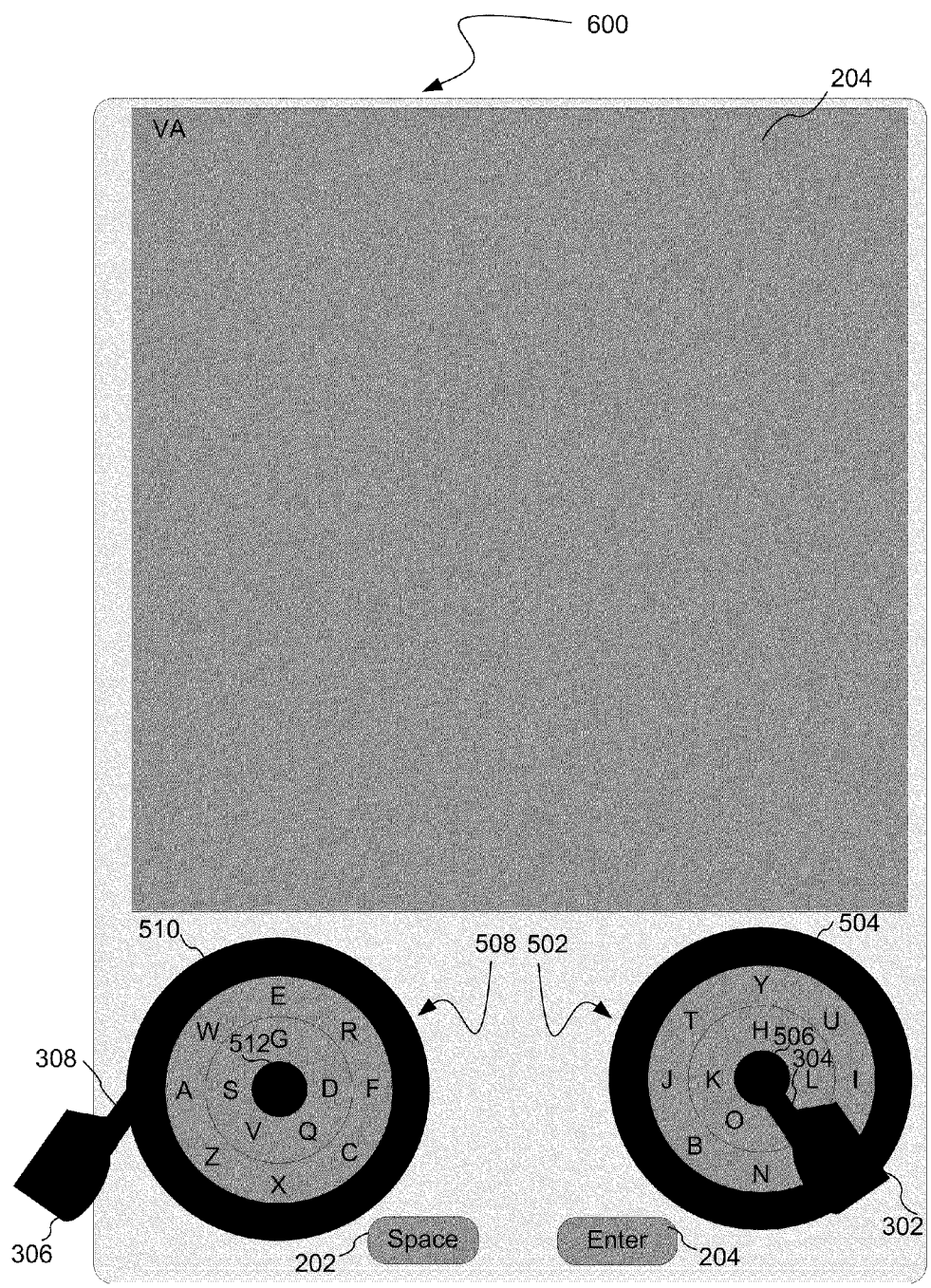
FIG. 7E illustrates the thumb of the user moving from the letter 'A' to the second outer rest pad.

FIG. 7E illustrates the thumb of the user moving from the letter 'A' to the second outer rest pad 510. As a result, the letter 'A' is inputted in addition to the letter 'V.' The user was easily able to move his or her thumb from a letter of choice in an outer region to an outer rest pad. In one embodiment, the last letter touched before the user touches a rest pad is the letter that is inputted. Accordingly, the user may slide his or her thumb over many letters, but the letter last touched prior to the user moving his or her thumb to a rest pad is the letter that is inputted.

The user may seamlessly move with natural motions of the thumbs over the touch pads and release to quickly input data. By not having to press buttons, the user also reduces the amount of strain on the thumb joints. Further, by not having to release the thumbs from the touch pads, the user avoids any discomfort of moving thumbs up and down. In other words, the configuration illustrated in FIGS. 5-7D may be utilized a user to slide his or her thumbs without pressing or releasing his or her thumbs from the touch pads. Further, the user can quickly move to different letters in the circular configurations. In addition, the user may develop the muscle memory for the positions of the letters. In another embodiment, grooves or other tactile indicators may indicate circular boundaries so that the user can feel when he or she is moving in or out of the outer region, inner region, or rest pad of a touch pad.

Figure 8:
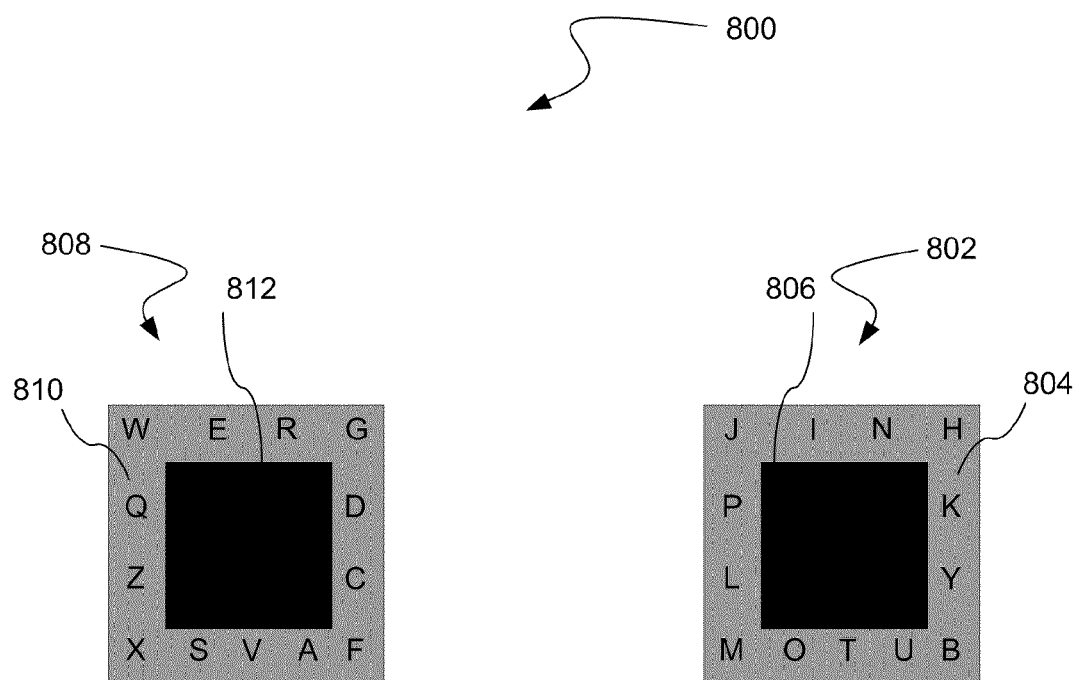
FIG. 8 illustrates another configuration of a DTPI.

FIG. 8 illustrates another configuration of a DTPI 800. In one embodiment, the letters in the alphabet are arranged in square regions. For example, a first touch pad 802 may be square with the letters in the alphabet arranged in a square region 804 surrounding a first rest pad 806. Further, the second touch pad 804 may be square with the letters in the alphabet arranged in a square region 810 surrounding a second rest pad 812. In one embodiment, a user may place a right digit on the first rest pad 806 and a left digit on the second rest pad 812. The user inputs a letter by moving a digit from a rest pad to a letter and then back to the rest pad. The movement may be a sliding motion. As a result, a user may slide digits without removing them from the touch pads to input letters.

For example, a user may slide his or her thumb from the second rest pad 812 to the letter 'V.' The user indicates that the letter 'V' should be inputted by moving, e.g., sliding, his or her thumb back to the second rest pad 812. In this configuration, the letter 'V' does not get inputted until the user moves his or thumb back to the second rest pad 812 to allow for the possibility that the user may change his or her mind about the letter he or she wishes to input. For example, the user may move his or her thumb initially from the second rest pad 812 to the letter 'V' and then decide to slide his or thumb to the letter 'Z' outside the periphery of the second rest pad 812. After the user slides his or her thumb on to the second rest pad 812 after last being on the letter 'Z,' only the letter Z is inputted.

In another configuration, the letters are inputted once the user touches a letter. However, in this configuration, the user has to remove his or her thumb from the rest pads and place them back over letters most of the time because the user will want to avoid inputting neighboring letters when such neighboring letters are in between two letters that the user would like to input. In yet another configuration, the letters are inputted once the user removes his or thumb from a letter rather than touching the letter.

Figure 9A:
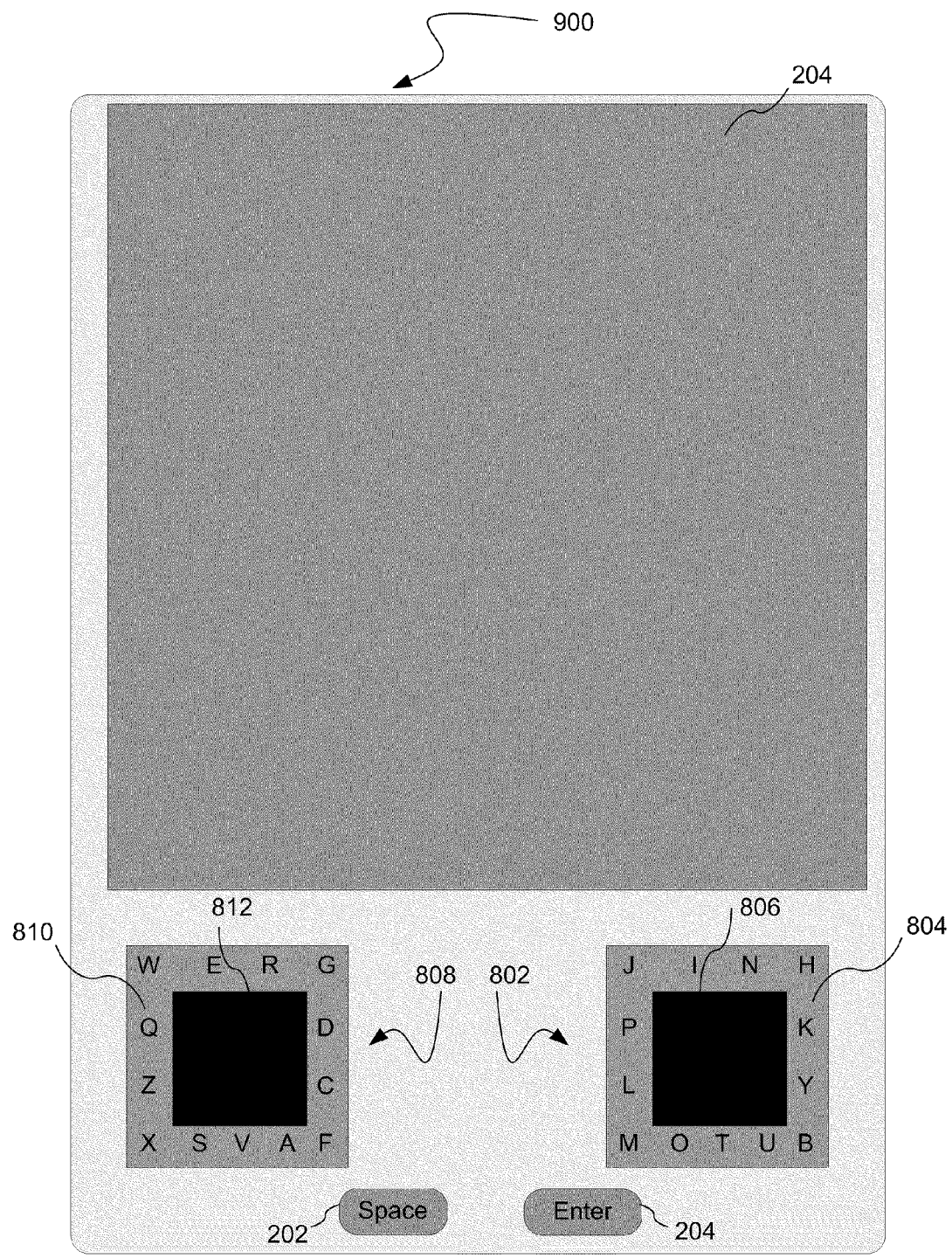
FIG. 9A illustrates the DTPI built into a smart phone.
Figure 9B:
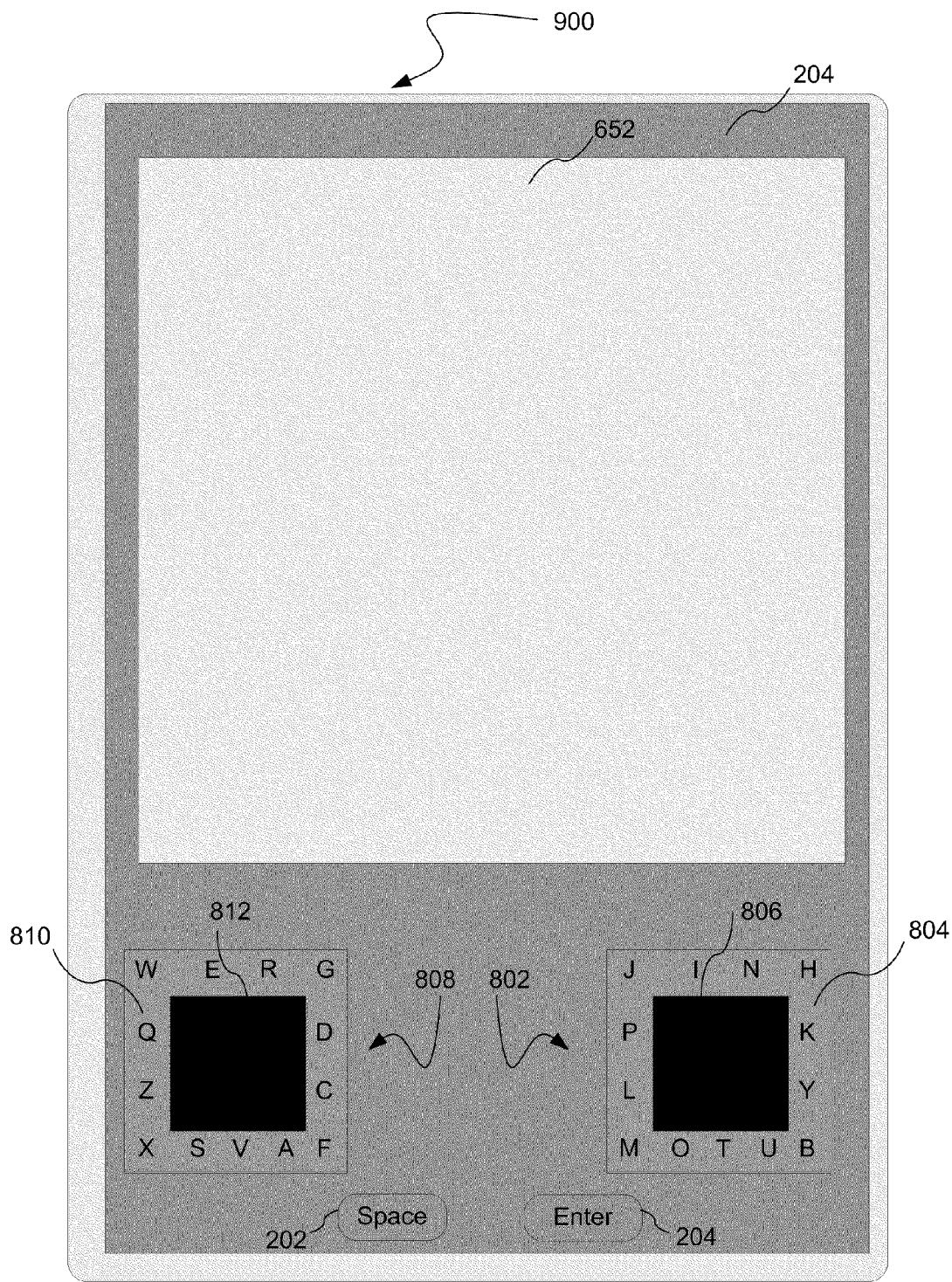
FIG. 9B illustrates the DTPI displayed in the GUI.

FIG. 9A illustrates the DTPI 800 built into a smart phone 900. Further, FIG. 9B illustrates the DTPI 800 displayed in the GUI 204.

Various shaped configurations may be utilized for the touch pads. For example, the configurations may be square, rectangular, circular, oval, triangular, hexagonal, etc. In one embodiment the touch pads are the same shape. In another embodiment, different shapes may be utilized for different touch pads.

Further, the touch pads are not limited to being positioned outside of the GUI 204. In one embodiment, the touch pads are virtual touch pads that are positioned within the GUI 204.

In one embodiment, additional pads and/or actuators may be utilized for numerals, punctuation, etc. For example, additional pads may be positioned next to the space pad 202 for numerals, punctuation, etc. In yet another embodiment, additional circles on the touch pads may be utilized for numerals, punctuation, etc. In another embodiment, virtual buttons may be utilized for numerals, punctuation, etc. As these additional functions are not typically utilized as much as letters of the alphabet, these functions may be positioned in a different position than the first touch pad 102 and the second touch pad 104.

Different numbers of regions may be utilized for any of the configurations provided herein. For example, a touch pad may have one surrounding region of letters, two surrounding regions of letters, etc.

In one embodiment, the letters are illustrated in a format that is nonconsecutive. Since QWERTY is nonconsecutive, a nonconsecutive format for DTPI may help users transition to the DTPI from a QWERTY keyboard. In another embodiment, the letters are displayed consecutively.

Although thumbs are illustrated in the corresponding figures, any digit of a user may be utilized. For example, fingers may be utilized instead of thumbs.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

Although the illustrated configurations are directed toward a smart phone, the configurations provided for herein may be utilized with a variety of other computing devices. As an example, a laptop may utilize the DTPI. As another example, a desktop computer may utilize the DTPI.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

I claim:

1. A smart phone having a dual touch pad interface comprising:
   a graphical user interface;
   a first touch pad, which is operably connected to the smart phone, that has a plurality of first touch pad sensors arranged in at least one first touch pad shaped layout such that each of the plurality of first touch pad sensors corresponds to a letter from a first subset of a set of letters in an alphabet;
   a second touch pad, which is operably connected to the smart phone, that has a plurality of second touch pad sensors arranged in at least one second touch pad shaped layout such that each of the plurality of second touch pad sensors corresponds to a letter from a second subset of the set of letters in the alphabet, the second subset including remaining letters in the alphabet that are distinct from that of the first subset; and
   a processor that (i) receives sensor data from the first touch pad and the second touch pad, (ii) determines a last character in the sensor data received prior to the user removing a digit from the first touch pad or the second touch pad, and (iii) outputs the last character to the graphical user interface.

2. The smart phone of claim 1, wherein the at least one first touch pad shaped layout is a square arrangement.

3. The smart phone of claim 1, wherein the at least one first touch pad shaped layout is a circular arrangement.

4. The smart phone of claim 1, wherein the at least one second touch pad shaped layout is a square arrangement.

5. The smart phone of claim 1, wherein the at least one second touch pad shaped layout is a circular arrangement.

6. The smart phone of claim 1, wherein the first subset is arranged in consecutive alphabetic order.

7. The smart phone of claim 1, wherein the first subset is arranged in nonconsecutive alphabetic order.

8. The smart phone of claim 1, wherein the second subset is arranged in consecutive alphabetic order.

9. The smart phone of claim 1, wherein the second subset is arranged in nonconsecutive alphabetic order.

10. A smart phone having a dual touch pad interface comprising:
    a graphical user interface;
    a first touch pad, which is displayed in the graphical user interface, that has a plurality of first touch pad sensors arranged in at least one first touch pad shaped layout such that each of the plurality of first touch pad sensors corresponds to a letter from a first subset of a set of letters in an alphabet;
    a second touch pad, which is displayed in the graphical user interface, that has a plurality of second touch pad sensors arranged in at least one second touch pad shaped layout such that each of the plurality of second touch pad sensors corresponds to a letter from a second subset of the set of letters in the alphabet, the second subset including remaining letters in the alphabet that are distinct from that of the first subset; and a processor that (i) receives sensor data from the first touch pad and the second touch pad, (ii) determines a last character in the sensor data received prior to the user removing a digit from the first touch pad or the second touch pad, and (iii) outputs the last character to the graphical user interface.

11. The smart phone of claim 10, wherein the at least one first touch pad shaped layout is a square arrangement.

12. The smart phone of claim 10, wherein the at least one first touch pad shaped layout is a circular arrangement.

13. The smart phone of claim 10, wherein the at least one second touch pad shaped layout is a square arrangement.

14. The smart phone of claim 10, wherein the at least one second touch pad shaped layout is a circular arrangement.

15. A smart phone having a dual touch pad interface comprising:

a graphical user interface;

a first touch pad, which is displayed in the graphical user interface, that has (i) a first rest pad and (ii) a plurality of first touch pad sensors arranged in at least one first touch pad shaped layout such that each of the plurality of first touch pad sensors corresponds to a letter from a first subset of a set of letters in an alphabet;

a second touch pad, which is displayed in the graphical user interface, that has (i) a second rest pad and (ii) a plurality of second touch pad sensors arranged in at least one second touch pad shaped layout such that each of the plurality of second touch pad sensors corresponds to a letter from a second subset of the set of letters in the alphabet, the second subset including remaining letters in the alphabet that are distinct from that of the first subset; and a processor that (i) receives sensor data from the first touch pad and the second touch pad, (ii) determines if the first rest pad or the second rest pad is touched by the user, (iii) determines a last character in the sensor data received prior to the user touching the first rest pad or the second rest pad, and (iv) outputs the last character to the graphical user interface.

16. The smart phone of claim 15, wherein the first touch pad is operably connected to the smart phone.

17. The smart phone of claim 15, wherein the second touch pad is operably connected to the smart phone.

18. The smart phone of claim 15, wherein the first touch pad is displayed in the graphical user interface.

19. The smart phone of claim 15, wherein the second touch pad is displayed in the graphical user interface.

20. The smart phone of claim 15, wherein a separate menu for numerals is displayed in the graphical user interface.

* * * * *